Oct. 8, 1929.  W. G. MAYER  1,730,940
TRUCK BODY
Filed March 15. 1926  4 Sheets-Sheet 1
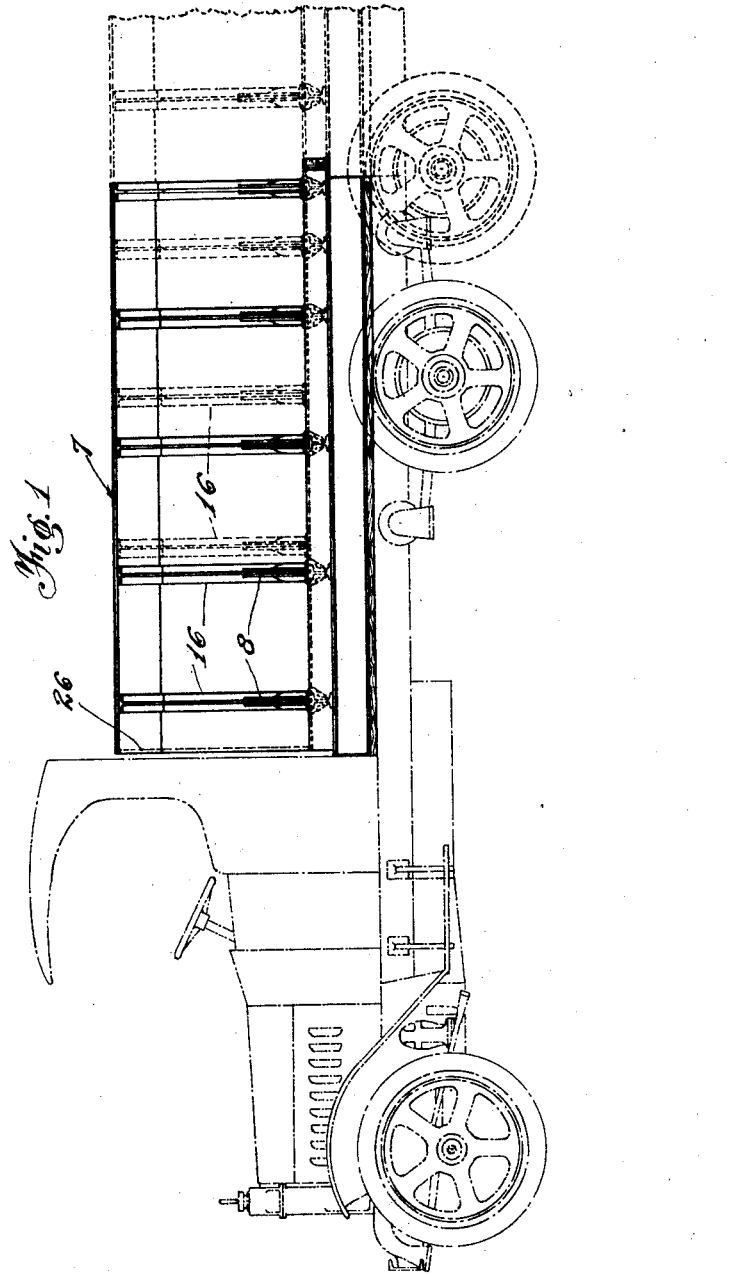
INVENTOR:
William G. Mayer
by Ralph Donath and
Paul Purchard
ATTORNEYS

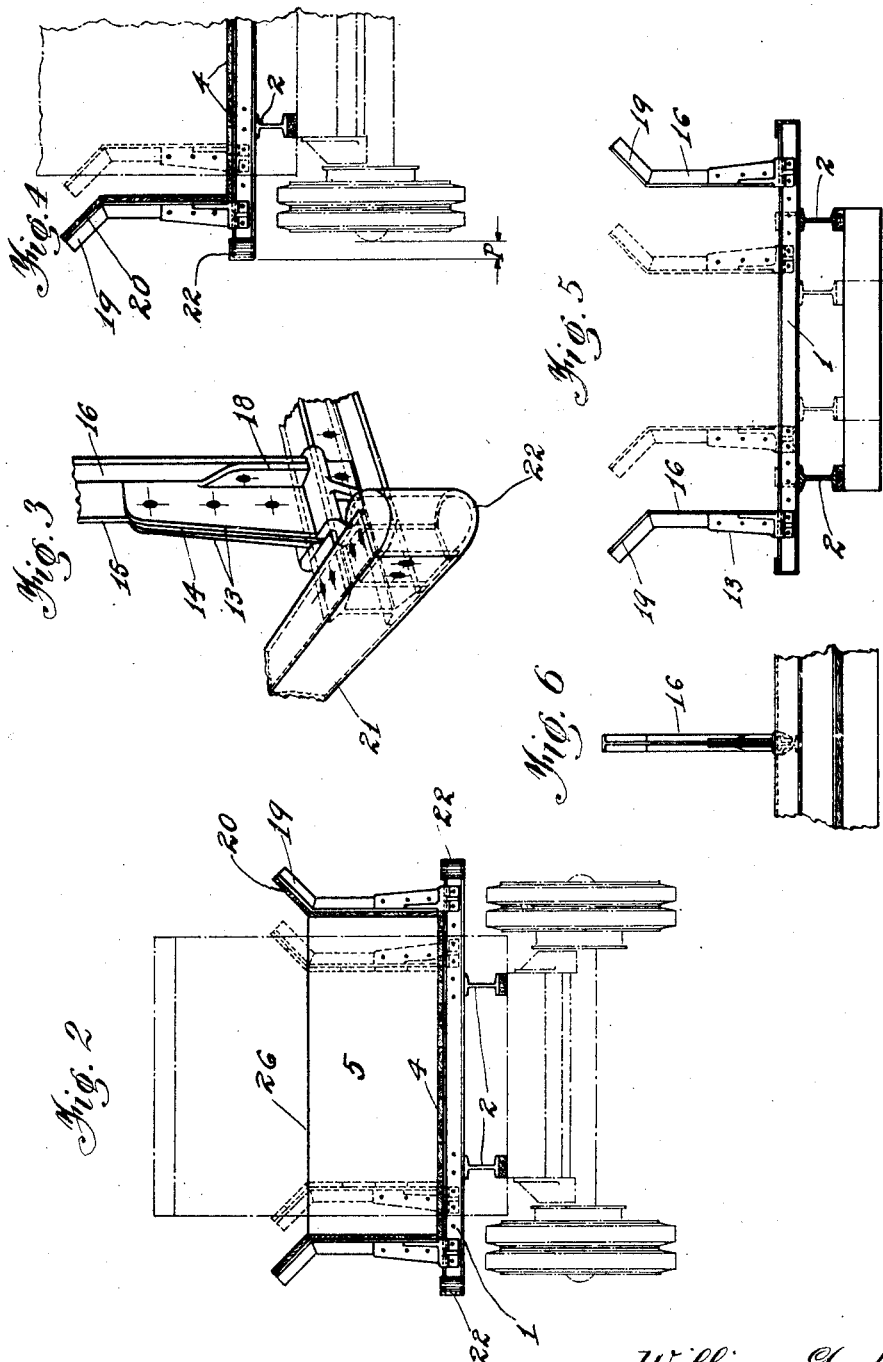

Oct. 8, 1929.  W. G. MAYER  1,730,940
TRUCK BODY
Filed March 15, 1926   4 Sheets-Sheet 3
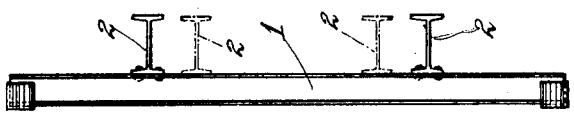
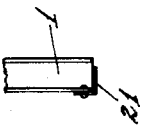
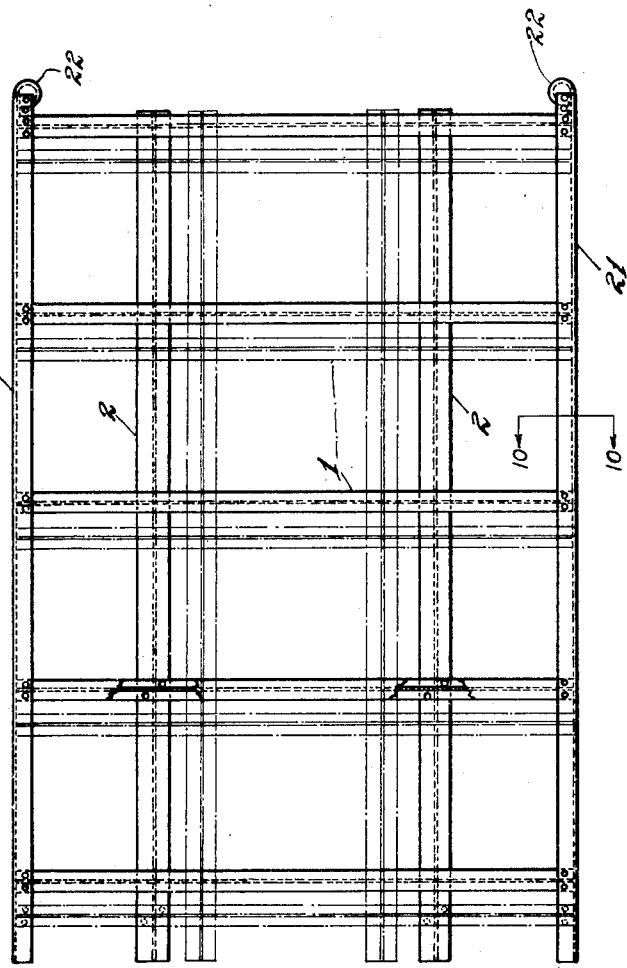
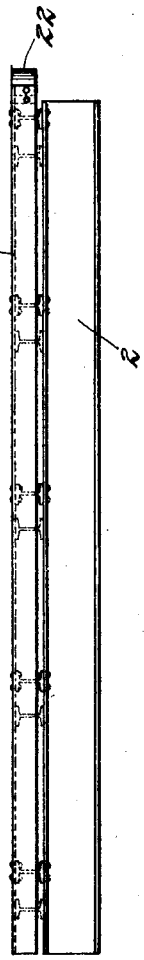

Oct. 8, 1929.  W. G. MAYER  1,730,940
TRUCK BODY
Filed March 15, 1926  4 Sheets-Sheet 4
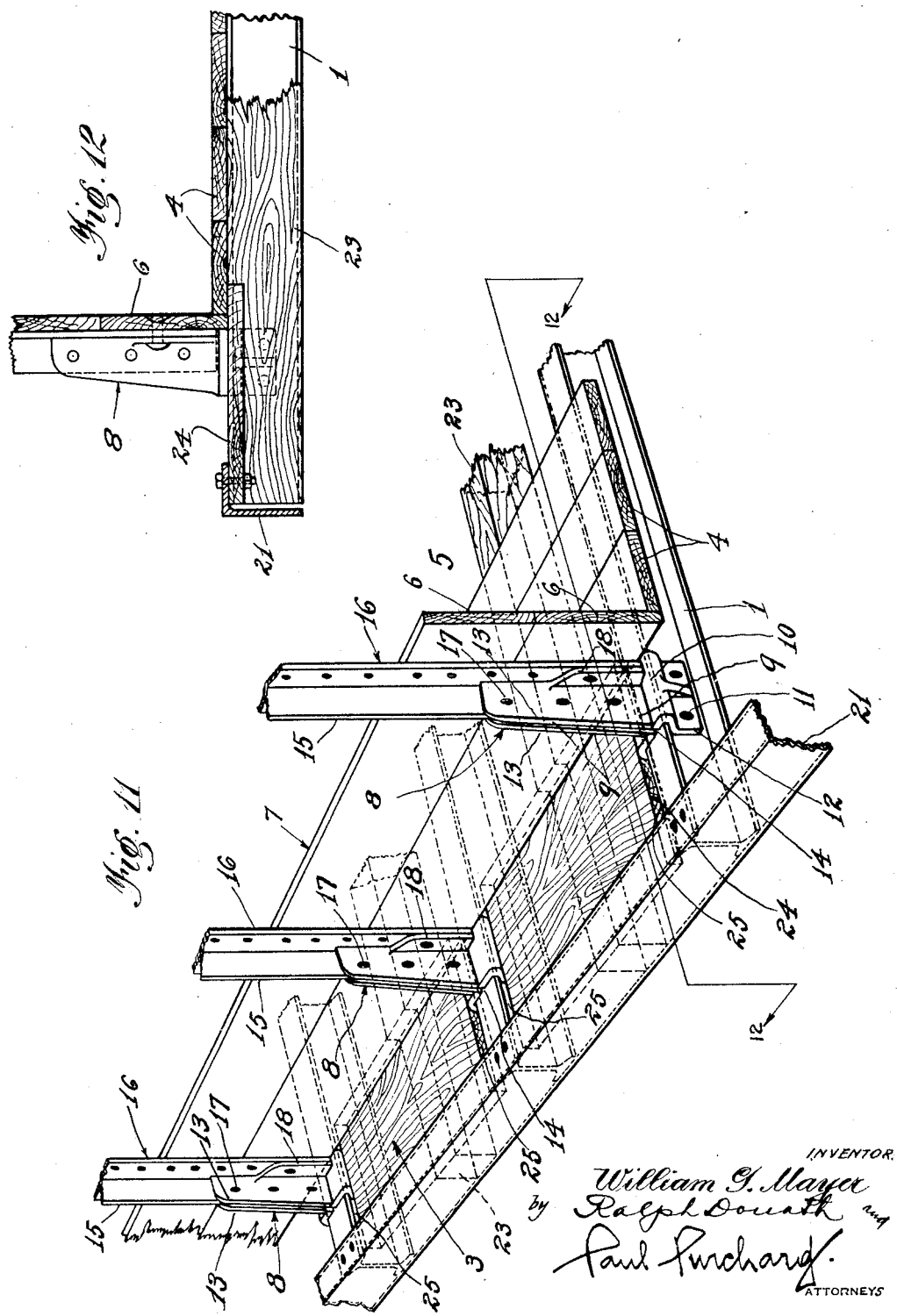

Patented Oct. 8, 1929

1,730,940

UNITED STATES PATENT OFFICE

WILLIAM G. MAYER, OF PITTSBURGH, PENNSYLVANIA

TRUCK BODY

Application filed March 15, 1926. Serial No. 94,706.

This invention relates to truck body constructions and more in particular to the construction of truck bodies adapted to be mounted on the chassis of automobile trucks. The primary object of this invention is to provide a truck body construction of great strength, as compared to its weight, in which the principal component parts are suitably formed and built to be adaptable to truck bodies of greatly varying sizes. Another object is to provide a construction which permits of the rapid and simple erection of truck bodies with the least amount of waste, by using metal parts of commercially standardized dimensions and wooden parts, such as for the floors and sides, which are also readily obtainable in the market. A further object is to provide truck bodies of this character having splash-boards made in sections suitably disposed to provide drainage for rain water. Additional features and advantages of this invention will appear from the following description considered in connection with the accompanying drawings forming part of this application, and in which:

Fig. 1 is a side elevation of an automobile truck and body, showing also in dotted lines a larger body to suggest the adaptability of this invention to bodies of varying sizes.

Fig. 2 is a rear elevation of Fig. 1.

Fig. 3 is a fragmentary perspective view of the preferred method of bracing the side-panels of the body to the frame structure thereof.

Fig. 4 is a partial rear end elevation of a heavy truck provided with a wide splash-board serving also as a protecting device for the axle and other parts of the truck.

Fig. 5 is a rear elevation illustrating the structural steel parts of the bodies shown in Fig. 1.

Fig. 6 is a side elevation of Fig. 5.

Fig. 7 is a top plan view of the floor of the truck bodies shown in Fig. 1.

Fig. 8 is an end view of Fig. 7.

Fig. 9 is a side elevation of Fig. 7.

Fig. 10 represents a section taken on line 10—10 in Fig. 7.

Fig. 11 is a fragmentary perspective view showing especially the splash-board of a truck body.

Fig. 12 represents a cross section taken on line 12—12 in Fig. 11.

Reference being had to the drawings, a truck body built in accordance with this invention comprises a required number of parallel cross sills 1 secured in any desired manner, such as by bolts, rivets or clamps on top of the longitudinal sills 2, or directly upon the longitudinal members of the frame of a truck chassis. These sills 1 are extended beyond both outer longitudinal sills an equal and sufficient amount to provide on both sides of the body the so-called splash-boards, or mud-boards, indicated generally by the reference number 3, the purpose of which is to protect the truck against mud thrown up by the wheels and against injury on account of their projections indicated by the letter P in Fig. 4. Upon said cross sills are fastened in any desired manner the longitudinally disposed flooring boards 4 of the box portion 5 of the body. The boards 6 forming the longitudinal sides 7 of said box portion are held in a vertical position by means of the steel side-braces 8 which in turn are secured to said cross sills. These side-braces are standardized as to shape and size to accommodate the type of cross sills used and the height of the box sides 7, and can, therefore, be used on truck bodies of varying length and width.

In the preferred embodiment of this invention, as shown in the various figures, the cross sills are made of I-beam sections and the side-braces comprise the symmetrical bracket-halves 9, the bases 10 which are each shaped to accommodate therein one half of the upper flange of said I-beams. These bracket-halves are secured to the web portions of said I-beams by means of bolts or rivets inserted through suitable registering apertures 11 provided in the flanges 12 of the brackets and in said webs. The arms 13 of these brackets are vertically disposed and leave therebetween an open space, or slot, 14 in which the web 15 of the T-shaped structural steel brace 16 may be inserted and rigidly held by bolts or rivets engaging registering holes 17 cut in said arms and web. If desired, the arms 13 may be strengthened by means of wings 18 formed integrally with each bracket-half. Also, the braces 16 may be bent outwardly at a desired angle to provide extensions 19 upon which the flare-boards 20 of the box sides 7 may be fastened.

As stated before, the cross sills 1 are extended beyond the longitudinal sills 2 and the sides 7 of the box portion 5 to provide for the mud-board 3. The exposed longitudinal edges of said mud-boards are protected against damage due to shocks, scraping or collisions by means of the steel rails 21 of any suitable commercial and standardized cross section, such as of angle cross section shown in the drawings. To these rails are also rigidly riveted or bolted the outer ends of the cross sills 1 whereby the whole sub-frame of the truck body is greatly strengthened by enabling all the cross sills to resist at the same time whatever strains may be imposed on the side rails 21. The latter are generally provided at their projecting rear ends with heavy bumper blocks 22 of suitable shape and size and which are secured to said rails by bolting or riveting. The purpose of these bumpers is, of course, to take up the original shocks incurred when backing the truck against unyielding obstacles, or in case of rear end collisions.

One of the particular features of this invention resides in the method of constructing the flooring for the mud-boards. This construction, as best illustrated in Figs. 11 and 12, consists in placing wooden cross sills 23 halfway between the steel sills 1 and immediately beneath the box portion 5 and additionally securing the floor boards 4 thereto. The outer portions of said wooden sills are recessed at the top to provide for the insertion of the short flooring boards 24 which reach partly underneath the main boring boards 4 and which also bear against the underside of the top flanges of the rails 21. The boards 24 are cut shorter than the distances between the flanges of the cross sills 1 so that open spaces 25 are produced for the purpose of draining the rain water, and so forth, which might otherwise accumulate on the mud-boards. The flooring boards are, of course, properly secured to the wooden sills and other parts by screws or bolts.

From the foregoing description it will be apparent to those versed in the art that this invention offers valuable time, labor and material saving improvements over the usual methods of building truck bodies which consists in using parts and shapes made expressly for a certain kind and size of truck, and which parts, owing to the great variety of truck bodies required by the trade, demand that an enormous amount of costly materials and special shapes be kept constantly in stock.

However, in manufacturing trucks according to the method forming the subject matter of this application, it is only necessary to keep in stock few sizes of standardized structural steel shapes and corresponding brackets for the side-braces. The boards for the flooring and sides for the box portion of the body are also of standard commercial sizes, and all these materials are cut in suitable lengths and numbers to suit the number and sizes of truck bodies required. The flooring for the mud-boards being composed of short lengths of boards, the latter are usually obtained from remnants resulting from the long boards required for the box portion, thereby effecting an appreciable economy, as well as a reduction in stock materials.

When building a truck body of this invention, the steel and wooden cross sills are first secured in proper spaced relation and alignment upon the longitudinal sills of said truck and to the side rails 21. The side-braces 8 are then fastened to the steel cross sills and the flooring boards 24 or the mud-boards are then put in place in the manner shown in Figs. 11 and 12. The longitudinal sides 7 and the front side 26 of the box portion are then set up, and the flooring boards 4 laid down.

The rear side of said box portion is generally closed up with a hinged gate of usual construction (not shown).

While I have illustrated and described herein the preferred embodiment of my invention, and one which I have found by actual use to be very practical, it may be thought desirable after continued experience to make slight changes in the construction and arrangement of the details of my invention, and I intend to include in this application all such variations as fall within the scope of the appended claims.

I claim:

1. In a truck body, a sub-frame comprising a plurality of longitudinal sills; a plurality of cross sills made of standardized structural steel shapes, and a plurality of wooden cross sills positioned intermediate said steel cross sills; means for securing said cross sills to said longitudinal sills; a plurality of side-braces; means to secure same to said steel cross sills, said side-braces being of standardized shapes and dimensions; a box portion for said body secured to said braces and cross sills; the latter having extensions on both sides of said box portion, and a mud-board positioned on each side of said box portion and supported by said extensions.

2. In a truck body, a sub-frame comprising a plurality of longitudinal sills and a plurality of cross sills secured to said longitudinal sills; a box portion positioned on said sub-frame; said cross sills forming extensions on both sides of said box portion, and mud-boards positioned on said extensions; said mud-boards comprising a plurality of component boards positioned in end to end relation between said cross sills and of lesser length than the space between the latter.

3. In a truck body, a sub-frame comprising a plurality of longitudinal sills and a plurality of cross sills secured to said longitudinal sills; a box portion positioned on said sub-frame; said cross sills forming extensions on both sides of said box portion; mud-boards positioned on said extensions; said mud-boards comprising a plurality of component boards positioned in end to end relation between said cross sills and of lesser length than the space between the latter, and means for supporting said component boards substantially at the middle thereof.

4. In a truck body, a body portion, a sub-frame therefor comprising a plurality of longitudinal sills and a plurality of cross sills secured thereon; said longitudinal and cross sills being made of structural steel of standardized shapes; said cross sills having extensions on both sides of said box portion; mud-boards positioned on said extensions, said mud-boards comprising a plurality of component boards positioned in end to end relation between said cross sills and of lesser length than the space between the latter, and a plurality of wooden cross sills positioned intermediate the steel cross sills and adapted to support the component boards of said mud-boards.

5. In a truck body, a body portion; a sub-frame therefor comprising a plurality of longitudinal sills and a plurality of cross sills secured thereon; said longitudinal and cross sills being made of structural steel of standardized shapes; said cross sills having extensions on both sides of said box portion; mud-boards positioned on said extensions, said mud-boards comprising a plurality of component boards positioned in end to end relation between said cross sills and of lesser length than the space between the latter; a plurality of wooden cross sills positioned intermediate the steel cross sills and having recesses cut at the top thereof adapted to receive the component boards of said mud-boards.

In testimony whereof I affix my signature.

WILLIAM G. MAYER.